W. H. ROWSWELL.
COMBINATION TESTING GAGE AND PUMP.
APPLICATION FILED NOV. 20, 1909.
975,638.
Patented Nov. 15, 1910.
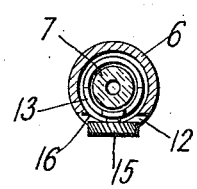
FIG. 4
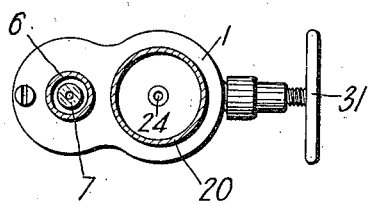
FIG. 3
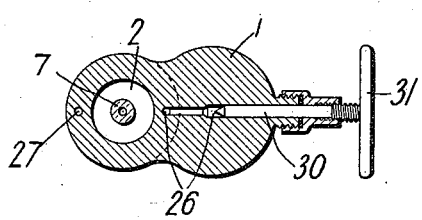
FIG. 2
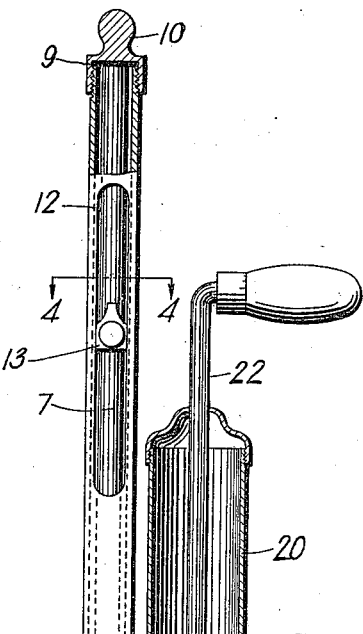
FIG. 1
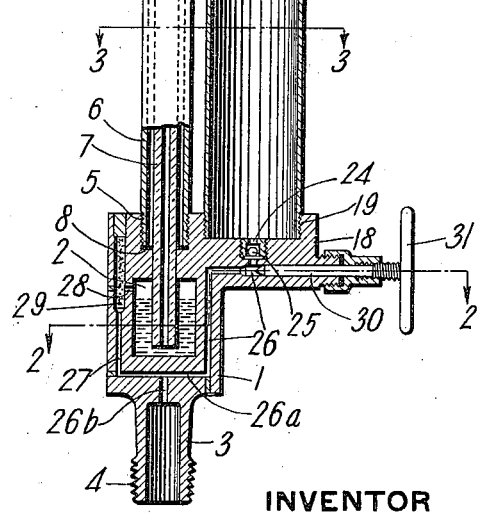
WITNESSES
Chas. Lasterman
Estelle M. Johnson
INVENTOR
William H. Rowswell
By Fredk W. Winter
Attorney

UNITED STATES PATENT OFFICE.

WILLIAM H. ROWSWELL, OF PITTSBURG, PENNSYLVANIA, ASSIGNOR OF ONE-HALF TO GEORGE H. BAILEY, OF PITTSBURG, PENNSYLVANIA.

COMBINATION TESTING-GAGE AND PUMP.

975,638.  Specification of Letters Patent.  Patented Nov. 15, 1910.

Application filed November 20, 1909. Serial No. 529,092.

*To all whom it may concern:*

Be it known that I, WILLIAM H. ROWSWELL, a resident of Pittsburg, in the county of Allegheny and State of Pennsylvania, have invented a new and useful Improvement in Combination Testing-Gages and Pumps, of which the following is a specification.

This invention relates to a testing gage and pump and more particularly to a device of the character named for the use of plumbers in testing gas and similar piping for buildings and the like.

The object of the invention is to provide a device for the purposes stated which is compact, which is convenient to carry and handle, which can be more readily and quickly connected to the line or pipe to be tested than prior devices, and in which the number of joints is reduced to a minimum thereby reducing liability of leakage in the testing device and hence securing a more accurate test.

Generally stated, the invention comprises a pump and a barometric testing column or tube both secured to the same base member so that the two can be handled and conveyed as a single instrument and can be attached by a single threaded connection to the pipe to be tested, together with suitable means for preventing the escape of the mercury or other testing liquid in the barometric tube or column, all as hereinafter described and claimed.

In the accompanying drawing, Figure 1 is in part a side elevation and in part a vertical section through the improved device; and Figs. 2, 3 and 4 are horizontal sections taken respectively on the lines 2—2, 3—3, and 4—4, Fig. 1.

In testing gas piping in dwellings and so forth, it is common practice to use what is known as a mercury gage which is provided with a barometric glass or column projecting down into a mercury chamber, and a pump for supplying air under pressure in the pipes to be tested and for forcing the mercury to rise in the glass or column. In prior devices of this character the pump is entirely separate from the gage, and in connecting the device up three or more joints are made between the device and the pipes to be tested, each of which is liable to leak. Furthermore, the mercury chamber is so arranged that the gage cannot be laid down or roughly handled without spilling the mercury. Consequently, it is necessary to carry the mercury in a separate receptacle until the place for making the test is reached where it is connected to the mercury column, and when the test is completed, the mercury chamber is again removed from the device and is closed up and carried separately. For the same reason the gage cannot be laid down in a horizontal position as the mercury would spill out, but must always be carefully set to one side. All of this has resulted in inconvenience and loss of time in carrying and handling the device.

In my improvement the pump and gage are united in a single instrument and so arranged that the mercury cannot escape even though the instrument be roughly handled or turned upside down.

The essential parts of the apparatus comprise a suitable base or connecting member 1 which in the preferred form is made as a casting. This member 1 has a main body portion provided with a chamber 2 for the mercury or other liquid, and on its bottom is provided with an extension 3 which is threaded at 4 for connection to the pipe to be tested, which connection can be made by means of an ordinary coupling or threaded socket. The upper face of the main body of the member 1 is provided with a threaded socket 5 into which is threaded the lower end of a metal tube 6, constituting the support and protector of a glass tube 7 forming the barometric column. This glass tube 7 projects down into chamber 2 close to the bottom thereof and mercury is prevented from escaping around the tube by interposing between the end of the metal tube 6 and the bottom of the socket 5 a suitable packing member, such as a rubber washer or gasket 8. The upper end of the glass tube 7 is closed by means of a felt or similar washer 9 which is pressed against the end of the tube by a cap 10 screwing onto the upper end of the metal tube 6. This felt washer 9 prevents the mercury from escaping but nevertheless is sufficiently porous to allow air to ecape from the glass tube, as is necessary when the mercury rises therein. The metal tube 6 on one side is provided with a cut-away portion or slot 12 through which the barometric tube is observed. A suitable pointer or gage 13 is provided, this being in the form of a short section of tube or sleeve surrounding the glass tube, and having connected thereto a headed member such as a set screw 15 by means of which said pointer can be raised and lowered. To hold the pointer in position in which set, the sleeve is merely turned sidewise until a beveled edge 16 of the tube 6 wedges between the set screws 15 and sleeve 13, and this frictionally holds the pointer in position.

The main body or member 1 is provided on one side with a projection 18 which on its upper face is provided with a threaded socket 19 into which is threaded the lower end of pump cylinder 20. This cylinder is of the ordinary form of air compressing pumps having a leather cup piston 21 connected to operating rod 22 which extends up through the upper head of the pump cylinder and is provided with a suitable operating handle. The outlet from the pump cylinder is through an opening 24 which is controlled by any suitable check valve 25. The opening 24 communicates with a passage 26 which is cored out or drilled into the body of member 1 and which extends down and communicates with a horizontal passage 26ª, from which leads a passage 26ᵇ extending through the threaded projection 4 for communication with the interior of the pipe to be tested. Another passage 27 leads upwardly from passage 26ª and communicates with a cross port 28 entering the upper end of mercury chamber 2. In some suitable place in passage 27 is provided a suitable air filtering and mercury checking means, this being shown as a filling 29 of felt or the like which is sufficiently porous to permit the air to pass therethrough and enter chamber 2 on top of the mercury in the latter, but nevertheless is sufficiently dense to prevent the mercury from escaping therethrough. A suitable valve is provided to close the passage 25 between the pump and the connection leading to the pipe to be tested, this being shown in the form of a needle valve 30 provided with a hand wheel 31.

In using the apparatus the projection 3 is connected to the pipe to be tested by an ordinary coupling. The entire instrument is complete in a single device, and the only connection necessary is to screw the projection 3 onto the pipe to be tested. This can be very quickly effected and there is only a single joint in the testing device at which leakage can occur, so that more accurate tests can be made than with the old form of apparatus. After the instrument is connected and valve 30 opened, the pump is operated to fill the pipe to be tested with compressed air and exert a pressure on top of the mercury or other liquid in chamber 2, such pressure causing said mercury or other liquid to rise in the tube 7 until the desired pressure is obtained. The valve 30 is then closed and the pointer 13 is set to indicate the height of the mercury column. The apparatus is allowed to remain in this condition for the required length of time to determine whether there is any leakage or not in the pipe being tested, such leakage making itself manifest by the dropping of the mercury column.

Any other liquid besides mercury could be used but the latter is preferred on account of its high specific gravity and its comparatively low mobility which will prevent it from passing through such a porous substance as felt.

It is obvious that by the use of the rubber packing 8 around the barometric pipe 7 and the felt 29 in the passage leading from the air pump to the mercury chamber and the felt washer 9 closing the upper end of the barometric tube, the mercury chamber is sealed as far as preventing the escape of the mercury is concerned. Consequently, the instrument can be transported in any convenient way, laid on its side or even turned upside down without danger of the mercury escaping.

The device described can be put in an ordinary plumber's kit or transported or carried in any other desired way. No care in handling the same is necessary and after the tests are made, the device can be laid down in any convenient place and special care to keep it in upright position need not be exercised, as the mercury cannot escape in any event. The gage is not divided so that it is not necessary to attach the barometric column to the mercury chamber before beginning the test or remove the same therefrom after completing the test as is necessary with the old form of devices. The device can also be connected to the tube to be tested very much more quickly than heretofore and with a lesser number of joints.

What I claim is:

1. A combined testing gage and pump comprising a base or connecting member provided with a mercury chamber, with a pump attachment, and with an outlet connection, a barometric column extending into said mercury chamber, and a pump cylinder attached directly to said base or connecting member, said base or connecting member being provided with passages extending from the pump to the mercury chamber and to the outlet connection.

2. A combined testing gage and pump comprising a base or connecting member provided with a mercury chamber, with a pump attachment, with an outlet connection, with a passage extending from the pump to the mercury chamber and with an outlet connection, a valve in said passage between the pump and outlet connection, a barometric column extending into the mercury chamber, and a pump cylinder attached directly to said base or connecting member.

3. A testing gage comprising a base or connecting member provided with a mercury chamber, with a pump connection, with a threaded outlet connection, and with a passage leading from the pump connection to the threaded outlet connection and to the mercury chamber, means in said passage leading to said mercury chamber for permitting the air to pass to the mercury chamber but preventing the mercury from escaping through said passages, a barometric column extending down into the mercury chamber and sealed thereinto.

4. A combined testing gage and pump comprising a base or connecting member provided with a mercury chamber, with a pump connection, with a threaded outlet connection, and with a passage leading from the pump connection to the threaded outlet connection and to the mercury chamber, means in said passage leading to said mercury chamber for permitting the air to pass to the mercury chamber but preventing the mercury from escaping through said passage, a barometric column extending down into the mercury chamber and sealed thereinto, and a pump cylinder connected directly to said base or connecting member.

5. A testing gage comprising a base or connecting member provided with a mercury chamber, with an outlet connection, with a pump connection, and with a passage leading from the pump connection to the outlet connection and to the mercury chamber, a valve in said passage between the pump connection and the outlet connection, means in the passage leading to the mercury chamber arranged to permit the air to pass therethrough but preventing the mercury from passing therethrough, a barometric tube projecting into the mercury chamber and sealed thereto, and a felt or similar washer closing the upper end of the barometric tube.

6. A combined testing gage and pump comprising a base or connecting member provided with a mercury chamber, with an outlet connection, with a pump connection and with a passage leading from the pump connection to the outlet connection and to the mercury chamber, a valve in said passage between the pump connection and the outlet connection, means in the passage leading to the mercury chamber arranged to permit the air to pass therethrough but preventing the mercury from passing therethrough, a pump cylinder connected directly to said base or connecting member, a barometric tube projecting into the mercury chamber and sealed thereto, and a felt or similar washer closing the upper end of the barometric tube.

7. A testing device comprising a mercury chamber and barometric tube projecting into the same, a pump connection to said mercury chamber, a metal tube surrounding the barometric tube and slotted on one side, the edges of the slot being beveled and an indicator comprising a sleeve surrounding the barometric tube and provided with a headed member arranged to have a beveled edge of the slot enter between the head and said sleeve.

In testimony whereof, I have hereunto set my hand.

WILLIAM H. ROWSWELL.

Witnesses:
F. W. WINTER,
JAS. L. WELDON.